INFORMATION TRANSMITTING SYSTEM FOR MOVING OBJECT

Filed Oct. 18, 1965 2 Sheets-Sheet 1

INVENTOR
Hiromu Obata
BY Stevens, Davis, Miller & Mosher
ATTORNEYS

INVENTOR
Hiromu Obata

BY Stevens, Davis, Miller & Mosher

ATTORNEYS

United States Patent Office 3,383,595

Patented May 14, 1968

3,383,595
INFORMATION TRANSMITTING SYSTEM FOR MOVING OBJECT

Hiromu Obata, 21—15 Takaoka-cho, Kanazawa, Japan

Filed Oct. 18, 1965, Ser. No. 497,234
Claims priority, application Japan, June 22, 1965, 40/37,151; Aug. 10, 1965, 40/48,842; Sept. 20, 1965, 40/57,096
2 Claims. (Cl. 325—64)

ABSTRACT OF THE DISCLOSURE

An information transmitting system for moving objects, such as vehicles, is disclosed in which audio information is transmitted by means of electromagnetic induction between a loop antenna installed at fixed location and a loop receiving antenna on the vehicle. A supersonic keying signal is superimposed on the audio information to cause a control device to switch the audio section of the vehicle radio over to reproduce the induced audio signal. Other keying signals may be used to cause playback from units storing prerecorded audio information mounted in the vehicle.

This invention relates to an information transmitting system for moving objects, such as vehicles, the information consisting of substantially voice signals.

The known practice for transmitting information signals for moving objects, such as vehicles, and thus transmit traffic warnings and the like, mainly consist in a visible means, for instance traffic controlling signs, or in a direct audible means, for instance alarm signals.

This invention has for its object to obtain a novel and simple system which can transmit audible information such as a human voice or audible signal by means of a receiving unit mounted on the vehicle and a fixed transmitting unit.

In order that the invention may readily be carried into effect reference will be made to the accompanying drawings, in which, FIG. 1 shows the over all arrangement of the system of the invention;

Figure 1:
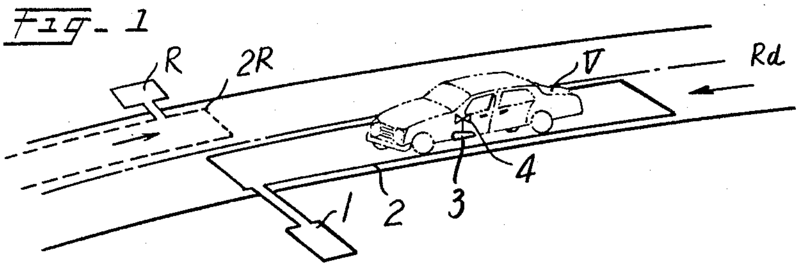
Figures 2, 3:
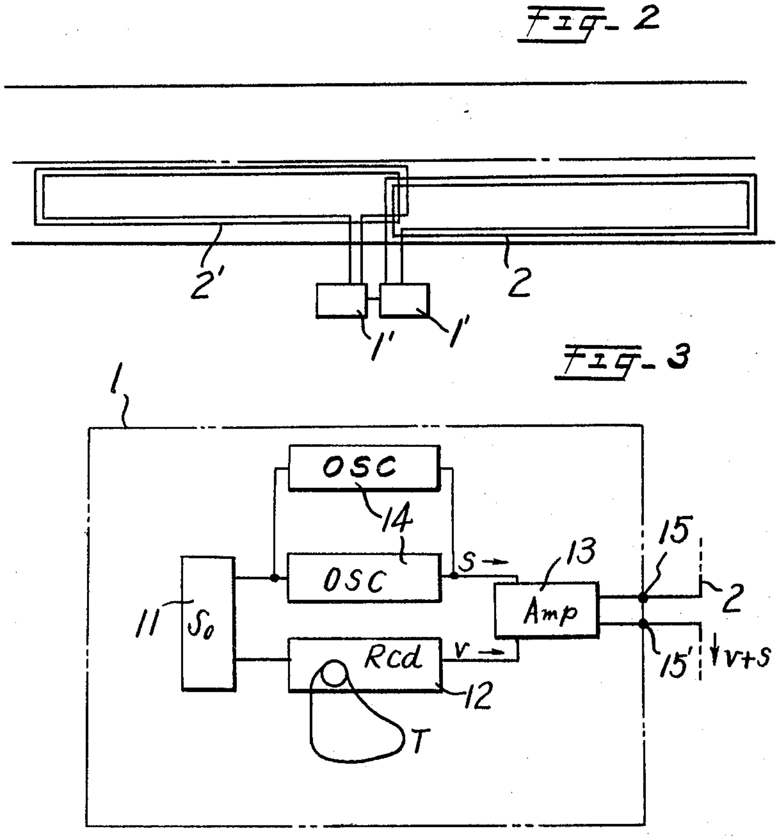
FIG. 2 shows the transmitting part of the system of the invention which is laid in one side of a road.
FIG. 3 is a block diagram showing the transmitting part of the invention.

FIG. 1 shows a practical embodiment of a traffic guide system for moving vehicles in accordance with the present invention. In FIG. 1 R*d* is a multi traffic lane road having each unidirectional lane shown by an arrow. As shown in the figure a loop transmitting wire 2 is laid closely on the road surface or buried under the surface of it. This transmitting loop may be arranged vertically beside the road as an alternative. In the figure dotted line 2R is another transmitting loop in the other traffic direction. If a longer distance is required for the transmission of the information, said loop transmission wire may be arranged so as to overlap at one end as shown in FIG. 2, and thus to obtain a transmission loop having the necessary length for the transmission. In FIG. 1, reference numeral 1 designates the transmitting equipment, and the vehicle V is provided a receiving coil 3 and receiving equipment 4 thereon. In the case of an area of left side traffic regulation, the receiving coil 3 is arranged at the left side of the vehicle. By supplying a voice signal to the loop transmitting wire 2 by the transmitting equipment 1, the signal may be detected by the receiving coil 3 as an induced voltage and received by the receiving equipment 4. Said signal via the loop transmitting wire 2 causes an induced voltage only when the vehicle is at the position shown in the figure and does not cause any induced voltage for the vehicle opposite running in the opposite direction. Therefore the system of the invention may afford an advantage to transmit a signal selectively in the moving direction of the moving object. It is evident that in the case of right hand traffic regulation, the required arrangement may be provided in a reversed manner.

FIG. 3 shows a block diagram of the transmitting equipment of the invention, which corresponds to the part 1 of FIG. 1 and 1 and 1' of FIG. 2. In FIG. 3, 11 designates a power source, 12 an information source such as a tape recording and reproducing device. The information source 12 sends out a recorded information signal *v* repeatedly by means of an endless tape T. The information signal output is amplified by an amplifier 13 and applied to the loop transmitting wire 2 via output terminals 15 and 15'. A switching signal oscillator 14 produces a switching signal *s*, which lies outside of the voice frequency band, for instance 17 kc, and applies the switching signal to the amplifier 13. The amplifier 13 amplifies the switching signal *s* and sends it out to the loop transmitting wire together with the voice signal *v*.

Figure 4:
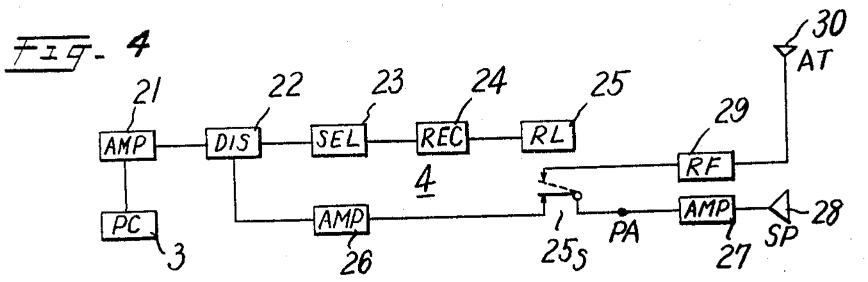
FIG. 4 is a block diagram showing the receiving part of the invention.

FIG. 4 shows a block diagram of the receiving part of the invention. In the figure, 3 is a pickup coil, which consists of a coil of 2000 turns on a core. The pick-up coil receives the emanated signal by electromagnetic induction from the loop transmitting wire, and supplies it to an amplifier 21. The amplifier 21 amplifies the received signal consisting of a combination of the voice signal *v* and the switching signal *s*, and applies it to a separating circuit 22. In the separating circuit 22 the two signals are separated by means of a simple filter circuit, and the switching signal *s* is detected by a tuned circuit 23, and amplifier according to the need, then rectified by a rectifying circuit 24 comprising a diode, and applied to a switching relay 25 to energize the windings thereof. The voice information signal *v* separated from the separating circuit 22 is delivered to a switching contact of the switching relay 25 via an amplifier 26 according to the need. The switching relay 25 is energized by means of the switching signal *s*, which is detected, amplified and rectified in the manner as described. The relay 25 moves its contact from the position shown by a dotted line to the position of the figure. In this condition, the information signal *v* is applied to a loud speaker 28 via an amplifier 27. Thus the loud speaker 28 reproduces the transmitted information.

When the moving vehicle passes out of the loop transmitting wire 2 both of the transmitted information signals and switching signals will disappear at the signal input, and the switching relay 25 releases its contact into the normal position shown by the dotted line. In this condition the amplifier 27 and the loud speaker 28 may be connected to a radio receiving circuit 29 and act as an ordinary radio receiver together with receiving antenna 30.

The equipment according to the present invention may easily be mounted on a moving object, such as a vehicle, and can transmit necessary information such as traffic information and alarm signals etc. in a selective manner for the vehicles passing in a certain direction while not disturbing the vehicles passing in the other traffic direction.

Figure 5:
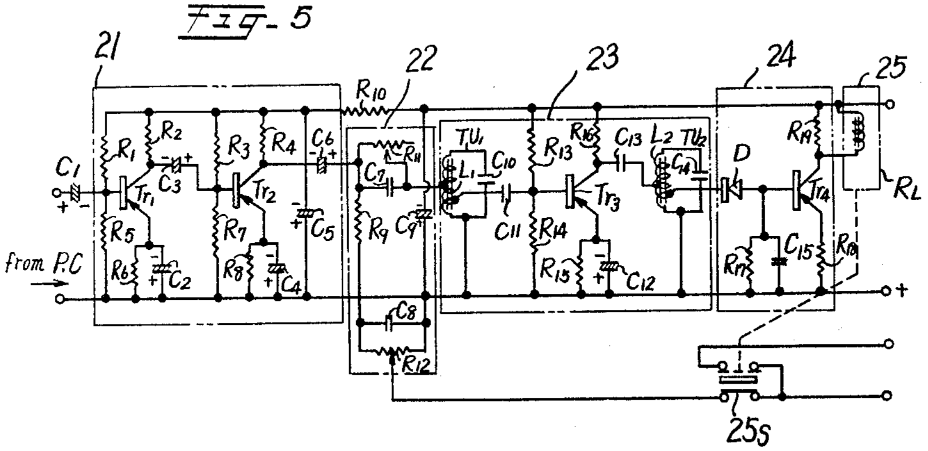
FIG. 5 is a circuit diagram of the receiving part of the invention.

FIG. 5 is a circuit diagram of the receiving equipment of the invention. In the figure, $C_1$, $C_2$ . . . $C_{15}$ designate condensers, $R_1$, $R_2$ . . . $R_{19}$ resistors and $Tr_1$, $Tr_2$ . . . $Tr_4$ transistors. The signal derived from pickup coil 3 is applied to an input terminal of an amplifier circuit 21 and, after amplification by the amplifier comprising transistors $Tr_1$ and $Tr_2$, is supplied to separating circuit 22. In the circuit 22, $C_7$ is a condenser of the value of 0.005 $\mu$f.~0.01 $\mu$f. and forms a simple highpass filter which passes the switching signal *s* without damping, considerably damps but the voice signals. $C_8$ is a condenser of about 0.005 $\mu$f. and forms a simple low-pass filter, which pases voice information signal *v* without damping but suppresses with considerable damping the switching signal *s*. Tuning circuit stage 23 comprises tuning circuits $TU_1$ and $TU_2$, both of which consist of an L-C circuit, and an amplifying transistor $Tr_3$, and sharply separate the switching signal *s*. The separated signal *s* is rectified by a diode D and is applied to the winding of the switching relay 25 via a transistor $Tr_4$ which acts as a switching transistor, and thus operates the relay 25. The relay 25 changes over contact 25*s* to the operating condition. In the circuit shown in FIG. 5 the amplifier 26 of FIG. 4 is omitted. By the changing over of the contact 25*s* the voice information signal *v* is delivered to an amplifier circuit via P.A. terminal. If the moving object is a motor car, the equipment of the invention may be combined with the car radio. The back contact of the switching contacts 25*s* in the released condition of the relay 25 forms a connection for a normal radio receiver. Even if a small content of the switching signal is mixed into said receiving circuit this does not make any adverse effect, since the signal is selected outside of the voice frequency band.

Figure 6:
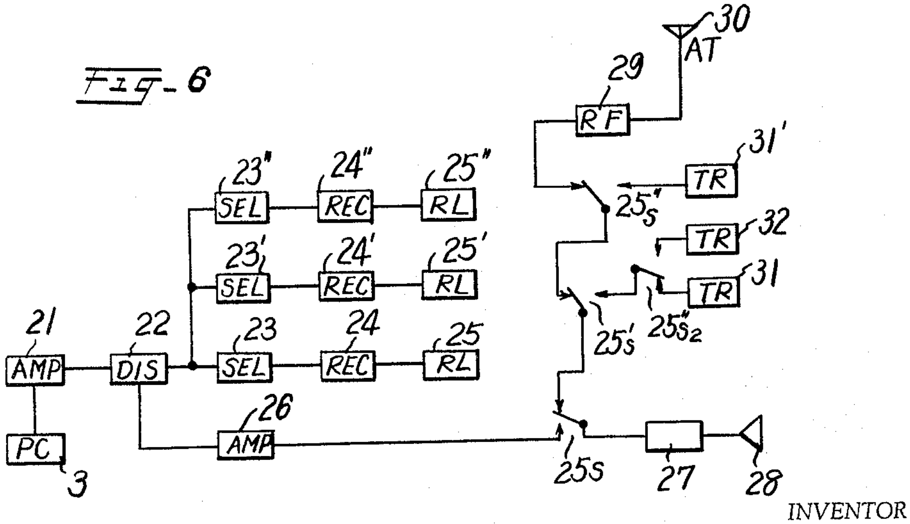
FIG. 6 shows a block diagram of an alternative embodiment of the system of the invention.

FIG. 6 shows one alternative of the invention. In this embodiment the transmitting equipment of FIG. 3 is provided with two or more switching signal oscillators 14, and transmits from the loop transmitting wire 2 a multiple switching signal for instance 15 kc., 16 kc., 17 kc. having 1 kc. frequency separations and selectively combined according to the predetermined locations and the pattern of the switching signals. The number of combinations of these switching frequencies may be two, three or any number according to the coded pattern. In the receiving circuit there are provided tuning circuits 23, 23′, 23″, each of which coresponds to the selective pattern of the switching signals, and each of which is associated with a rectifying circuit and switching relay such as 24, 24′, 24″ and 25, 25′, 25″ respectively. If a switching signal corresponding to the switching circuit of the relay 25 is received, this relay changes over its contact 25*s* and the circuit operates in the same manner as described with FIG. 4 previously. However, if the signal corresponding to the switching circuit of relay 25′ or 25″ is received, the corresponding relay operates and by the closing of contact 25*s′* or 25*s″*. the amplifier 27 and hence the speaker 28 are connected to a local information source such as tape recording and reproducing equipment 31 and 31′ mounted on the vehicle and previously recorded with a certain predetermined type of information signal, when two signals, which correspond to the relay 25′ and 25″, are received both of the relays operate and by the changing over of the relay contact 25*s′* and 25*s″* the voice signal circuit is connected to the third recorded information source 32 and thus reproduces the recorded information therein.

In the information transmitting system according to the invention, during the transmission of the information signal, one or more switching signals is superposed thereon and thus keeps the switching relay operated during the reception of the information signal, therefore the required information can be transmitted selectively by means of a very simple circuit.

The equipment of the invention can be conveniently applied for the controlling system of the vehicles which are reserved for a predetermined parking station or parking building. The moving object of the invention is not limited to a motor vehicle only but it is also conveniently applied for elevators for transmitting a guide for shopping.

What I claim is:

1. An information transmitting system comprising in combination; a fixed transmitting unit comprising
- a power supply source which supplies electric power to the transmitting unit,
- a recording and reproducing means having a supply source for sending out recorded information signals repeatedly by means of an endless tape,
- a switching signal oscillator fed by the power supply source and producing a continuous switching signal above of the voice frequency band such as a frequency selected from 15 to 17 kc.,
- an amplifier fed by the supply source and electrically connected to the recording and reproducing equipment and to the switching signal oscillator so as to produce an amplified information signal superposed with the switching signal,
- a loop transmitting wire immediately adjacent an area for the transmission of the information and electrically connected to receive said superposed signal of said information signal and said switching signal;
- and a mobile receiving unit for receiving both conventional broadcasting and said superposed signal comprising
- a pick-up coil which induces voltage by means of electromagnetic induction between said coil and said loop transmitting wire and said coil being adapted to receive said transmitted signal,
- an amplifying circuit connected to the pick-up coil to amplify the received signal,
- a separating circuit connected to the amplifying circuit and comprising a high-pass filter element having a resistor and a capacitor element and a low-pass filter element having a resistor and a capacitor element, wherein the high-pass filter element passes the switching signal substantially undamped but considerably damps the voice signal and the low-pass filter element passes the voice information signal substantially undamped but considerably damps the switching signal so as to save amplifying gain in the succeeding stage,
- a tuning circuit connected to the high-pass output of the separating circuit to detect the transmitted switching signal,
- a rectifying circuit connected to the tuning circuit and comprising only one diode,
- speaker means,
- and a switching relay means connected to the output of the rectifying circuit and adapted to respond to change over its switching contact upon receipt of the switching signal so as to change over said speaker means from conventional broadcasting reception to said low-pass filter to respond to the transmitted audio frequency information signal which is derived from output terminal of the low-pass filter element.

2. An information transmitting system comprising in combination, a fixed transmitting unit comprising a power supply source, a recording and reproducing means for reproducing voice frequency information, a switching signal oscillator producing a switching signal outside of the voice frequency band, an amplifier and a loop transmitting wire connected to said amplifier, said recording and reproducing means and said oscillator being connected in parallel between said power supply source and said amplifier, whereby a superposed signal of a voice frequency information signal reproduced by the recording and reproducing device and the switching signal frequency band is supplied to said loop transmitting wire after amplification; and a mobile receiving unit for receiving both conventional broadcasting and said superposed signal comprising a pick-up coil which induces voltage by means of electromagnetic induction between said coil and said loop transmitting wire and thus receiving said transmitted superposed signal, an amplifying circuit electrically connected to said coil, a separating circuit connected to said amplifying circuit and separating said information signal and said switching signal, a tuning circuit and a rectifying circuit comprising at least one diode serially connected to said separating circuit, and a switching relay means connected to said rectifying circuit and adapted to change over its switching contact from conventional broadcasting reception upon receipt of the switching signal so as to condition the receiving unit to receive the transmitted audio frequency information signal, at least two switching signal oscillators provided in the transmitting unit to thus selectively produce combined switching signals, said receiving unit further comprising a corresponding number of channels of said tuning circuit, said rectifying circuit and said switching relay means to thus selectively receive an information from the fixed transmitting unit and from at least one local information source mounted on the mobile unit and storing prerecorded audio frequency information therein.

References Cited

UNITED STATES PATENTS

| | | | |
|---|---|---|---|
| 2,429,607 | 10/1947 | Capen | 179—82 |
| 2,974,221 | 3/1961 | Peth | 325—392 X |
| 3,017,631 | 1/1962 | Fink et al. | 343—225 |
| 3,044,043 | 7/1962 | Wendt | 340—32 |
| 3,094,682 | 6/1963 | Brosh et al. | 340—32 X |
| 3,105,119 | 9/1963 | Cory et al. | 179—82 |
| 3,275,756 | 9/1966 | Vauquelin et al. | 340—52 X |
| 3,290,597 | 12/1966 | Denny et al. | 325—64 |
| 2,617,923 | 11/1952 | Rekart | 325—64 X |

ROBERT L. GRIFFIN, *Primary Examiner.*

JOHN W. CALDWELL, *Examiner.*

B. V. SAFOUREK, *Assistant Examiner.*